United States Patent [19]
Petersen et al.

[11] 4,264,901
[45] Apr. 28, 1981

[54] MOISTURE DETECTING AND ALARM DEVICE

[76] Inventors: Lee O. Petersen, 4611 Lakeside Dr.; Norris A. Lauer, 215 1/2 S. Walnut; William R. Farrall, P.O. Box 1037, all of Grand Island, Nebr. 68801

[21] Appl. No.: 925,248

[22] Filed: Jul. 17, 1978

[51] Int. Cl.³ .................. G08B 3/00; G08B 23/00; H01R 3/08
[52] U.S. Cl. .................. 340/604; 200/61.05; 324/65 P; 340/636
[58] Field of Search ............ 340/604, 605, 620, 636, 340/603; 324/65 P, 65 R; 200/61.04, 61.05

[56] References Cited

U.S. PATENT DOCUMENTS

| 3,098,116 | 7/1963 | Jore et al. ............ 200/61.04 X |
| 3,728,706 | 4/1973 | Tipton et al. .......... 340/629 X |
| 3,864,627 | 2/1975 | Shigo ................. 324/65 P |
| 3,927,370 | 12/1975 | DeBough .............. 324/65 R |
| 3,958,157 | 5/1976 | Huang ................ 340/620 X |
| 4,037,206 | 7/1977 | Dobrzanski et al. ..... 340/636 X |
| 4,056,978 | 11/1977 | Zimmermann .......... 340/620 X |
| 4,083,037 | 4/1978 | Larsen ............... 340/629 |

FOREIGN PATENT DOCUMENTS 1540626 1/1970 Fed. Rep. of Germany ........ 324/65 R

Primary Examiner—Thomas W. Brown
Attorney, Agent, or Firm—Henderson & Sturm

[57] ABSTRACT

A water detector alarm is disclosed. The device includes a power supply, an alarm unit, moisture detecting electrodes and circuitry for activating the alarm unit in response thereto, and a power monitoring unit for monitoring the power supply and activating the alarm unit when the power supply grows weak, with a frequency noticeably distinct from the water presence alarm frequency.

10 Claims, 6 Drawing Figures

MOISTURE DETECTING AND ALARM DEVICE

BACKGROUND OF THE INVENTION

The device disclosed herein contemplates generally the art of environment sensitive alarm devices, and in particular alarm devices responsive to the presence of conducting fluids.

Many instances are known in the prior art where it is desirable to monitor the presence of water or other fluids. For instance, the home owner is concerned when water accumulates on the basement floor. The boat owner may be sensitive to fluid accumulation in the bilge. Industry is concerned in a great variety of processes and other manufacturing environments with the presence of accumulating fluids. These are but a few of the instances where an operator is concerned with the potential presence of fluid.

It is quite obviously economically unfeasible to maintain a physical guard over the area to be monitored. Therefore, a need exists for effective and reliable non-human monitoring. Beyond this, it is generally desirable that the monitoring be conducted at the lowest possible cost without the sacrifice of concurrent reliability. Many operators also have need for a portable monitoring apparatus, or for a device that will effectively monitor a substantial sized area.

Many electrical devices are known in the prior art to conduct the monitoring of various environments. In addition to relative economy and efficiency, such electronic devices are usually well adapted for dispersal as portable units, concurrent with the needs of the art. Such portable units generally contemplate the use of a portable power supply: i.e., a battery. Unfortunately, with such battery powered devices, if the battery is used to power the alarm unit, the battery will become depleted. The ultimate result is usually the ceasation of the alarm unit.

Also, in many environments where moisture monitoring is required, it is not always likely that an operator will be in the vicinity at all times to immediately respond to the alarm. Therefore, it is desirable that such an alarm would continue to sound for a substantial period of time, thereby increasing the likelihood that an operator approaching the monitored environment will be able to respond thereto. Obviously, if the battery expires, and no operator heard the alarm prior to such expiration, the monitoring and alarm device will have failed its purpose.

Therefore, there is also a need in the prior art for a portable monitoring and alarm device operable by battery that will continue to sound an effective alarm for a substantial length of time, which will monitor the power supply, which will monitor a substantial area and which will float if necessary, while continuing to sound the alarm.

SUMMARY OF THE INVENTION

The instant invention is responsive to these needs by the provision of a water detecting alarm device that includes a portable power supply unit, an alarm unit, moisture detecting electrodes or the like for activating the alarm unit in response to the presence of moisture, and a power monitoring unit for monitoring the power supply and selectively activating the alarm unit in response to the weakening of the power supply.

It is therefore a primary object of this invention to provide a water detecting alarm device.

It is another object of this invention to provide a water detecting alarm device that is portable and easily moved from one monitored area to another.

It is another object of this invention to provide a water detecting alarm device operable in connection with a battery or other similar portable power source.

It is yet another object of this invention to provide a water detecting alarm device that is capable of monitoring and detecting the presence of moisture over a relatively large area.

It is another object of this invention to provide a water detecting alarm device that will sound intermittent alarm blasts in the presence of moisture, to extend the operative life of the power supply.

It is yet still another object of this invention to provide a water detecting alarm device responsive to the energy depletion of the power supply, by introducing greater delays between some of the alarm blasts to further delay expiration of the power supply.

It is yet another object of the invention to provide a water detecting alarm device having noticeable differences in audible alarm signals between water detection alarm and low power supply alarm.

It is yet another object of the invention to provide a water detecting alarm device that is buoyant and will continue to operate while afloat.

It is yet another object of the invention to provide a water detecting alarm device which is responsive to low resistance between at least two probes and upon sensing such a low resistance will sound an audible alarm.

It is yet another object of the invention to provide adjustable probe posts to establish the level of detectable water.

It is yet another object of the invention to provide alternative moisture detection probes which are extendable and can be in a location remote from the alarm device.

BRIEF DESCRIPTION OF THE DRAWINGS

These objects and others will become more apparent when taken upon reference to the following detailed description, and particularly when studied in conjunction with the appended drawings, wherein.

DESCRIPTION OF THE PREFERRED EMBODIMENTS

Figure 1:
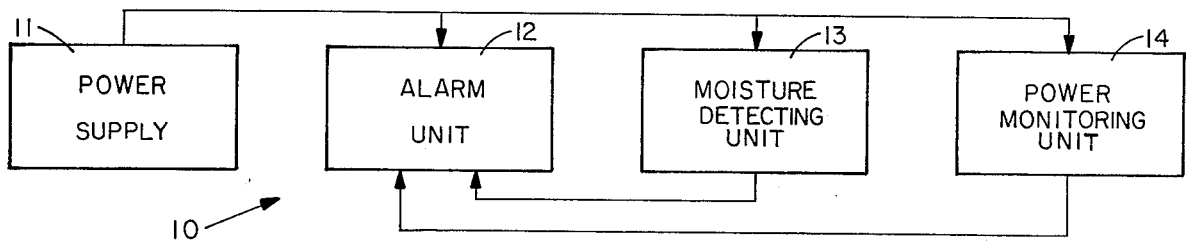
FIG. 1 is a block diagram of the invention.

Referring now to the drawings, and in particular to FIG. 1, the device as represented in block diagram form may be seen generally as denoted by the numeral 10. More particularly, the device 10 includes a power supply 11, an alarm unit 12, a moisture detecting unit 13 and a power monitoring unit 14.

The power supply 11 is representative of a portable power supply, such as a battery. The alarm unit 12 is provided to issue an audible alarm blast in response to appropriate stimuli.

The moisture detecting unit 13 is provided to sense the presence of moisture in the appropriate environment, and in the presence of moisture, to activate the alarm unit 12. Additionally, the moisture detector unit 13 includes a timing unit that operates to intermittently activate the alarm unit 12, in a series of alarm blasts, rather than one continuous blast.

Finally, the power monitoring unit 14 is provided to operate the alarm unit 12 when the moisture detecting unit 13 is inoperable or will operate for only a short while longer due to low battery voltage. The power monitoring unit 14 operates the alarm unit 12 less sedulously in order to extend the operable life of the power supply 11.

Figure 2:
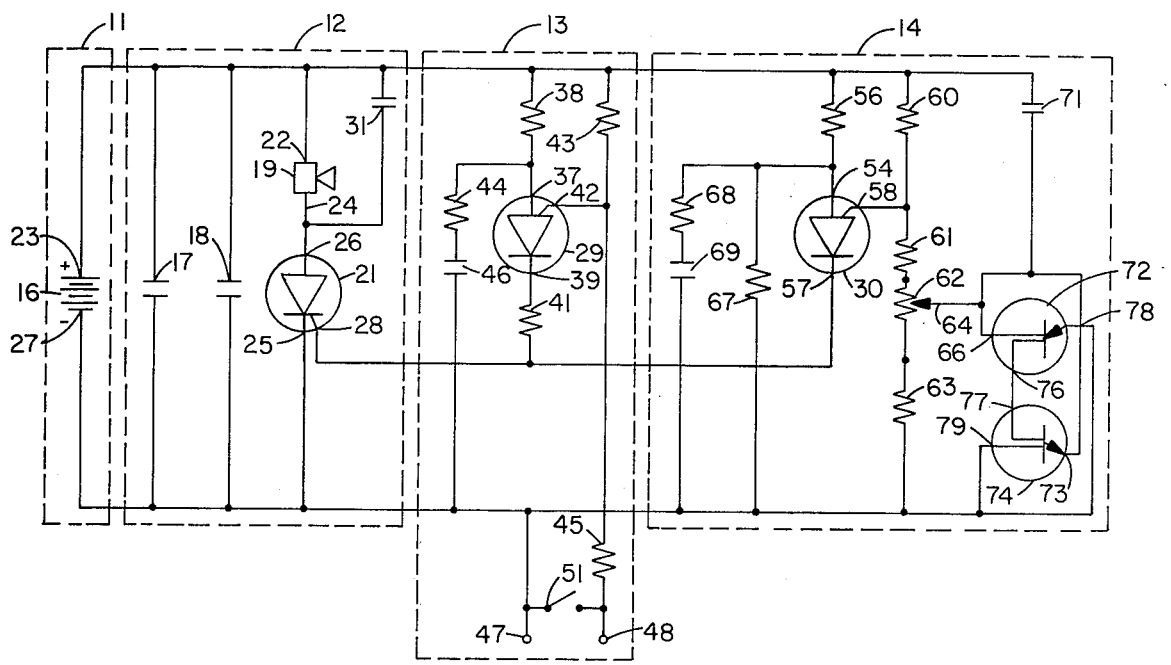
FIG. 2 is a schematic representation of the invention.

Referring now to FIG. 2, a first embodiment of the device 10 will now be disclosed. The power supply 11 is realized here by the provision of a 6 battery source 16. Additionally, two capacitors 17 and 18 are connected in parallel across the battery 16. One being an electrolytic 17 and the second being of the ceramic disc variety 18. The ceramic capacitor 18 having a higher frequency response is used to filter transients which the lower frequency electrolytic capacitor 17 would not filter. The two capacitors 17 and 18 alternately would be replaced with a higher frequency responsive capacitor such as a tantalum type capacitor.

The alarm unit 12 includes generally an audio transducer unit 19 and a silicon controlled rectifier 21. Alternatively, a different audio transducer and an NPN transistor with the appropriate current values as required by the transducer could be employed in the circuit. The transducer unit 19 may be a buzzer, a speaker and oscillator circuit, a horn, or any one of the many transducer units known in the prior art. One end 22 of the transducer unit 19 is connected to the positive terminal 23 of the battery 16, and the remaining lead 24 is connected to the anode 26 of the SCR. The cathode lead 25 of the SCR 21 is connected to the negative terminal 27 of the battery 16 with the gate 28 thereto being connected to the cathode side of the two Programmable Unijunction Transistors (PUT) 29 and 30 located in the moisture detecting unit 13 and the power monitoring unit 14 to be further described below.

If a two lead audio transducer 19 is utilized, as in this embodiment, it is often desirable to eliminate any electromotive (EMF) interference that might otherwise confuse operation of the device 10. Such elimination is achieved herein by the provision of a 0.01 microfarad capacitor 31 connected between the positive terminal 23 of the battery 16 and a point between the transducer unit 19 and the anode 26 of the SCR 21.

The moisture detecting unit 13 is operably constructed generally about a PUT 29. (A PUT is essentially a silicon controlled rectifier having an anode connected gate and is represented herein by a 2N6028.) Specifically, the anode 37 of the PUT 29 is connected to the positive terminal 23 of the battery 16 by a 330k ohm resistor 38, the cathode 39 of the PUT 29 is connected to the gate 28 of the above mentioned alarm unit SCR 21 by a 2.7k ohm resistor 41 and the gate 42 of the PUT 29 is connected to the positive terminal 23 of the battery 16 by a 220k resistor 43 and to one of the detection probes 48 by a 470k ohm resistor 45. The anode 37 of the PUT 29 is also connected to the negative terminal 27 of the battery 16 by a serially connected 15 ohm resistor 44 and a 1 microfarad electrolytic capacitor 46.

Provision is also made in the moisture detecting unit 13 for two moisture detecting probes 47 and 48. The first probe 47 is connected directly to the negative terminal 27 of the battery 16. The remaining probe 48 is connected to the gate 42 of the PUT 29 by a 470k ohm resistor 45. To allow an integrity check, a test switch 51 is connected between the two moisture detecting probes 47 and 48.

Finally, the power monitoring unit 14 will be described. The power monitoring unit 14 is also largely constructed about a second PUT 30, the PUT 30 again being represented herein by a 2N6028. More specifically, the anode 54 of the second PUT 30 is connected to the positive terminal 23 of the battery 16 by a 470k ohm resistor 56, the cathode 57 of the second PUT 30 is connected directly to the gate 28 of the above mentioned alarm unit SCR 21 and the gate 58 of the second PUT 30 is connected to the positive terminal 23 of the battery 16 by a 100k ohm resistor 60 and to the negative terminal 27 of the battery by a serially connected 100k ohm resistor 61, a 100k ohm potentiometer 62, and a one M ohm resistor 63. Additionally, the anode 54 of the second PUT 30 is connected to the negative terminal 27 of the battery 16 by a 3.3M ohm resistor 67 and the anode 54 of the second PUT 30 is also connected to the negative terminal 27 of the battery 16 by a serially connected 15 ohm resistor 68 and a 2.2 microfarad electrolitic capacitor 69.

Finally, in order to adjust the sensitivity of the power monitoring unit 14 the third lead 64 of the potentiometer 62 is connected to the positive terminal 23 of battery 16 by a 0.47 microfarad milar capacitor 71. The third lead 64 of potentiometer 62 is also connected to the drain 66 of a N-channel field effect transistor (FET) 72 and to the gate 73 of P-channel FET 74. The source 76 of the N-channel FET 72 is connected to the source 77 of the P-channel FET 74. The gate 78 of the N-channel FET 72 is connected to the negative terminal 27 of battery 16 as is the drain 79 of the P-channel FET 74.

It might be noted at this point that the N-channel FET 72 and the P-channel FET 74 are connected in a configuration known as a "Lambda diode."

Referring to FIG. 2, the operation of the device 10 will now be disclosed in detail. When no conductive moisture exists between any of the opposing probe surfaces 47 and 48, the device 10 remains in an initial monitoring state. The two capacitors 17 and 18 connected in parallel across the battery 16 are fully charged, and operate to eliminate or render non-complicating any transient voltages that may be introduced into the system. Also, the capacitors 46 and 69 connected between the anode 37 and 54 of both PUTS 29 and 30 and the negative terminal 27 of the battery 16 are fully charged. A slight drain on the battery 16 is realized as a slight current will flow through 470k ohm resistor 56 in series with 3.3M ohm resistor 67 and through the series resistor chain of 100k ohm resistor 60, 100k ohm resistor 61, 100k ohm potentiometer 62 and one M ohm resistor 63.

When sufficient moisture accumulates between the moisture detecting probes 47 and 48, such that current may flow between the two, the device 10 becomes operative. The flow of current through and between the 330k, and the 200k, and 470k ohm resistors 43, 38 and 45 in the moisture detecting unit 13 are sufficient to cause a gate 42 current to flow in the first PUT 29 thereby causing current to flow between the anode 37 and the cathode 39 thereof. This current flows by way of resistor 41 through the gate 28 of the alarm unit SCR 21, thereby causing the SCR 21 to conduct and pull current through the audio-transducer unit 19. This, of course, causes an alarming sound to be heard. It will be noted that the 1 microfarad capacitor 46 begins to discharge as soon as the first PUT 29 begins to conduct. As it discharges, current at the anode 37 of the first PUT 29 drops, ultimately causing the first PUT 29 to cease conducting. When the audio-transducer 19 current drops below the SCR 21 holding current, SCR 21 will stop conducting and the audio-transducer 19 will be switched off. The 1 microfarad capacitor 46 will again charge to a voltage sufficient to cause the first PUT 29 to conduct and thereby again activate the alarm unit 12. The RC network 44 and 46 thus provides an intermittent alarm which conserves the battery and allows the alarm to be activated for an extended period of time.

A battery, however, is not an inexhaustible source of power. When the 6-volt battery 16 drops sufficiently in potential, the moisture detecting unit 13 will no longer operate, due to the breakover voltage requirements of the first PUT 29, and the biasing influences of the 220k ohm resistor 43 connected to the gate 42 thereof. The power monitoring unit 14 is operable at these lower voltages however, and operates as follows.

The two unipolar FET's 72 and 74 do not allow more than a negligible amount of current to flow between the drain 66 of the N-channel FET 72 and the drain 79 of the P-channel FET 74 until the battery voltage is reduced below a value established by the choice of components themselves. Prior to the depletion of the battery 16 the 0.47 microfarad capacitor 71 is slowly charged through the one M ohm resistor 63 by way of the third lead 64 of the 100k ohm potentiometer 62. The purpose of the 0.47 microfarad capacitor 71 is to quickly raise the potential across the combined unipolar FET's 72 and 74 so as to insure that the FET's 72 and 74 do not continue to conduct as the battery 16 or a combination of batteries are being placed in the alarm unit 10.

When the potential across the drains 66 and 79 of both unipolar FET's 72 and 74 falls below a preset voltage, the FET's 72 and 74 allow a current to be conducted through the 100k ohm resistor 60, the 100k ohm resistor 61 in series and the 100k ohm potentiometer 62 and thence through the drain 66 of the N-channel FET 72 through the source 76 of the N-channel FET 72 through the source 77 of the P-channel FET 74 and to the drain 79 of the P-channel FET 74. The gate of the second PUT 30, having current applied, is turned "on" thus allowing the 2.2 microfarad capacitor 69 to discharge through the anode 54 of the second PUT 30 to the cathode 57 of the second PUT 30 and applying a current to the gate 28 of the SCR 21 which in turn causes the SCR 21 to switch "on" and the audiotransducer 19 to sound an audible alarm until the 2.2 microfarad capacitor 69 is discharged. At that point, the entire process is repeated and the alarm 10 will thus sound intermittently until the battery 16 is so weak that it is unable to operate the audio-transducer 19.

Of course, if the power monitoring unit 14 were to operate the alarm unit 12 as often and for as long a duration as the moisture detecting unit 13, the battery 16 would continue to deplete at as fast a rate, the low power monitoring time would be reduced. The power monitoring unit 14, however, makes provision for a 2.2 microfarad capacitor 69 as versus the 1 microfarad capacitor 46 provided in the moisture detecting unit 13.

Since the durations of the alarm blast and the delay intervals between such soundings are dependent upon the discharge and charging functions of the capacitor 69, it will be seen that the larger valued capacitor 69 will cause a longer delay period in between soundings of the alarm, since there will be longer durations when the second PUT 30 is not conducting.

Therefore, in summary of the circuit employed, it may be seen that when the battery 16 becomes low, the moisture detecting unit 13 will be inhibited by its own internal biasing, and the power monitoring unit 14 will continue to sound the alarm, with greater time intervals between soundings of the alarm, and for shorter periods of actual alarm operation. With less demand being made upon the battery 16, the battery life will be extended, and the device 10 will continue to sound its intermittent alarm for a number of hours. In practice, the above circuit has been shown to operate satisfactorily for up to 10 hours.

As the alarm unit 10 is dependent upon moisture detection probes 47 and 48, these probes will be discussed in detail.

Figure 3:
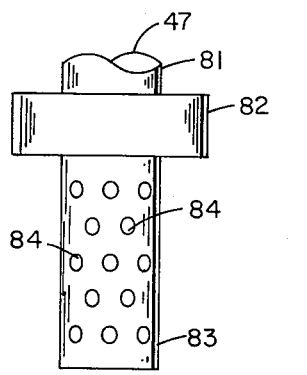
FIG. 3 is a fragmentary front elevational view of one embodiment of a moisture detecting probe.
Figure 4:
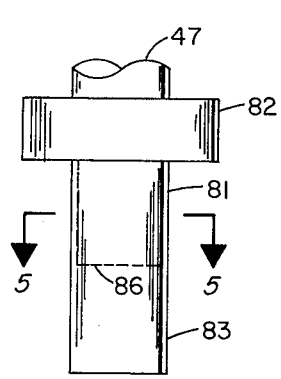
FIG. 4 is a fragmentary sectional front elevational view of another embodiment of a moisture detecting probe.
Figure 5:
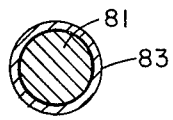
FIG. 5 is a cross-sectional view of the moisture detecting probe shown in FIG. 4 taken substantially along line 5—5 in FIG. 4.

Referring to FIG. 3, one embodiment of the moisture detection probes 47 and 48 may be seen. The conductive material of the post 81 is electrically attached to the moisture detection probe connections 47 or 48. Post 81 is an electrically conductive material which in practice forms a supporting leg for the alarm unit. Another similar post forms an additional supporting leg. Post 81 provides a support ring 82 and dielectric sheath 83. Dielectric sheath 83 covers the downwardly protruding conductive post 81 as shown in FIG. 4. In FIG. 5, it can be seen that post 81 is covered by dielectric sheath 83. In the embodiment depicted in FIG. 3, moisture inlet holes 84 are provided to allow conductive moisture to reach conductive post 81 which is generally shorter in length than dielectric sheath 83.

In use, dielectric sheath 83 is cut or broken off to the desired length in the two such posts, one of which is connected to terminal 47 the other to terminal 48. The length of sheath 83 extending beyond the end 86 of post 81 would correspond to the maximum depth of water or other conductive moisture one wishes to allow prior to activating the alarm unit 12. When the water reaches the post 81 by way of inlets 84, a conductive path is established between terminals 47 and 48 of the circuit in alarm unit 12 thereby activating the device 10.

Figure 6:
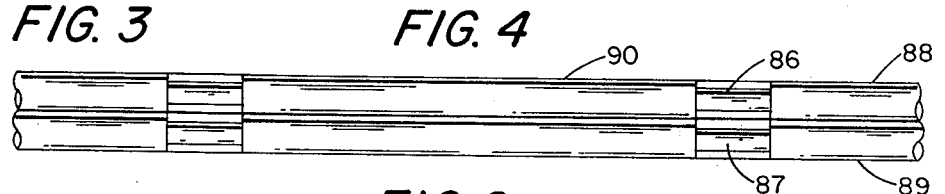
FIG. 6 is a fragmentary front elevational view of another embodiment of the moisture detecting probes.

FIG. 6 discloses an additional probe unit 90 in which conductive wires 86 and 87 which are connected respectfully to terminals 47 and 48 are enclosed in protective dielectric sheath 88 and 89. The sheath 88 and 89 is removed at intervals to expose the conductive wires 86 and 87. When conductive moisture is present, a conductive path is established between terminals 47 and 48 of the current in which unit 12 thereby activates the device 10. In practice, probe unit 90 can be cut to any length and placed around a room, basement, or anywhere one would want to detect the presence of moisture.

Also the device 10 may be housed in a floatable container or structure (not shown) which would allow the alarm to be activated even in the event that great quantities of moisture are present. It is contemplated that the alarm unit housing would thus be sealed against moisture with only the probes exposed to detect moisture.

Obviously, many modifications and variations of the present invention are possible in light of the above teachings. It is therefore to be understood that, within the scope of the appended Claims, the invention may be practiced otherwise than as specifically described.

We claim:

1. A moisture detecting and alarm device for operable use with a portable power supply, the portable power supply having a positive terminal and a negative terminal and having a finite useful life characterized by a power capacity that depletes over time with usage, the moisture detecting and alarm device comprising:
   alarm means for signalling the presence of conductive moisture;
   moisture detecting means for sensing the presence of conductive moisture and for operably connecting and disconnecting in a cyclical manner said alarm means to and from the portable power supply in response thereto, said moisture detecting means being operable to so connect said alarm means only when the portable power supply is substantially nondepleted;
   power monitoring means for operably connecting and disconnecting in a cyclical manner said alarm means to and from the portable power supply in response to the sensing that the portable power supply is approaching a less than substantially nondepleted condition;
   first timing means for controlling the length of time said power monitoring means cyclically connects and disconnects said alarm means to and from the power supply; and
   second timing means for controlling the length of time said moisture detecting means cyclically connects and disconnects said alarm means to and from the power supply.

2. A moisture detecting and alarm device as described in claim 1 wherein said alarm means includes:
   an audio transducer having a first lead and a second lead;
   a silicon controlled rectifier having a cathode, an anode and a cathode connected gate wherein said silicon controlled rectifier is serially connected with said audio transducer and the portable power supply.

3. A moisture detecting and alarm device as described in claim 2 wherein said moisture detecting means includes:
   a first programmable unijunction transistor having a cathode, an anode and an anode connected gate;
   a first resistor;
   a second resistor; and
   a third resistor such that the cathode of said first programmable unijunction transistor is operably connected to the gate of said silicon controlled rectifier, said first resistor is connected between the anode of said first programmable unijunction transistor and the positive terminal of the portable power supply, said second resistor is connected between the gate of said first programmable unijunction transistor and the positive terminal of the portable power supply, and said third resistor is connected between the cathode of the first programmable unijunction transistor and the gate of the silicon controlled rectifier.

4. A moisture detecting and alarm device as described in claim 3 wherein said second timing means includes:
   a fourth resistor; and
   a first capacitor, said fourth resistor and said first capacitor being serially connected between the anode of said first programmable unijunction transistor and the negative terminal of the portable power supply.

5. A moisture detecting and alarm device as described in claim 3 wherein said power monitoring means includes a second programmable unijunction transistor having a cathode, anode and an anode connected gate; a fourth resistor; a fifth resistor; a sixth resistor; a seventh resistor; an eighth resistor; a potentiometer; a first capacitor; a first unipolar field effect transistor having a source, a gate and a drain; and a second unipolar field effect transistor having a source, a gate and a drain; such that the cathode of the said second programmable unijunction transistor is connected to the gate of said silicon controlled rectifier, said fourth resistor is connected between the anode of said second programmable unijunction transistor and the positive terminal of the portable power supply, said fifth resistor connected between the anode of said second programmable unijunction transistor and the negative terminal of the portable power supply, said sixth resistor connected between the positive terminal of the portable power supply and the gate of said second programmable unijunction transistor, said seventh resistor connected between the gate of said second programmable unijunction transistor and said potentiometer and said eighth resistor connected between said potentiometer and the negative terminal of the portable power supply, said first capacitor connected between the positive terminal of the portable power supply and the third lead of said potentiometer, said third lead of said potentiometer connected to the drain of said first unipolar field effect transistor is connected to the source of said second unipolar field effect transistor, said gate of said second unipolar field effect transistor is connected to the third lead of said potentiometer, said gate of said first unipolar field effect transistor is connected to the negative terminal of the portable power supply and the drain of said second unipolar field effect transistor is connected to the negative terminal of the portable power supply.

6. A moisture detecting alarm device as described in claim 5 wherein said second timing means includes: a ninth resistor and a second capacitor, said ninth resistor and said second capacitor being serially connected between the anode of said second programmable unijunction transistor and the negative terminal of the power supply.

7. A moisture detecting and alarm device as described in claim 6 wherein:
   said alarm means further includes:
   a third capacitor, connected between the anode of said silicon controlled rectifier and the positive terminal of the portable power supply.

8. A moisture detecting and alarm device as described in claim 7 wherein said moisture detecting means further includes:
   a first moisture detecting probe connected to the negative terminal of the portable power supply; and
   a second moisture detecting probe operably connected to the gate of said first programmable unijunction transistor.

9. A moisture detecting and alarm device as described in claim 8 wherein:
   said alarm means further includes:
   a fourth capacitor; and
   a fifth capacitor, said fourth and fifth capacitors being connected in parallel across the portable power supply; and said moisture detecting means further includes:
an tenth resistor; and
a test switch having a small resistance, wherein said eleventh resistor is connected between the gate of said first programmable unijunction transistor and said second moisture detecting probe.

10. A moisture detecting and alarm device as described in claim 1 wherein said moisture detecting means includes a first and a second moisture detecting probe wherein said probes are each comprised substantially of a length of electrically insulated wire, the interior of which is constructed of an electrical conducting material, a portion of the insulation thereabout being removed at various intervals to expose adjacent portions of said electrical conducting material of each of said first and second moisture detecting probes.

* * * * *